United States Patent [19]
Kim

[11] Patent Number: 5,828,637
[45] Date of Patent: Oct. 27, 1998

[54] SERVO CONTROL DEVICE OF OPTICAL DISK RECORDING AND REPRODUCING APPARATUS

[75] Inventor: Dae Young Kim, Seoul, Rep. of Korea

[73] Assignee: LG Electronics Inc., Seoul, Rep. of Korea

[21] Appl. No.: 788,183

[22] Filed: Jan. 24, 1997

[30] Foreign Application Priority Data

Jan. 24, 1996 [KR] Rep. of Korea ..................... 1996/1517

[51] Int. Cl.$^6$ ........................................ G11B 7/09
[52] U.S. Cl. ..................... 369/44.28; 369/44.32; 369/44.25; 369/44.41
[58] Field of Search ............................. 369/44.25, 44.27, 369/44.28, 44.29, 44.32, 44.34, 44.37, 44.41, 43, 47, 58

[56] References Cited

U.S. PATENT DOCUMENTS

| | | | |
|---|---|---|---|
| 5,148,424 | 9/1992 | Wachi | 369/44.28 X |
| 5,168,487 | 12/1992 | Ohsato et al. | 369/44.28 X |
| 5,623,461 | 4/1997 | Sohmuta | 369/44.28 X |
| 5,671,200 | 9/1997 | Yamaguchi et al. | 369/44.28 |

*Primary Examiner*—Muhammad N. Edun

[57] ABSTRACT

A servo control device of an optical disk recording and reproducing apparatus which is capable of performing tracking control and sled control by detecting radial shift indicative of a degree of deviated from the center of an objective lens in an optical pick-up unit and by detecting a tilt indicative of inclination of an optical disk, thereby achieving a good reproducing signal quality.

24 Claims, 8 Drawing Sheets

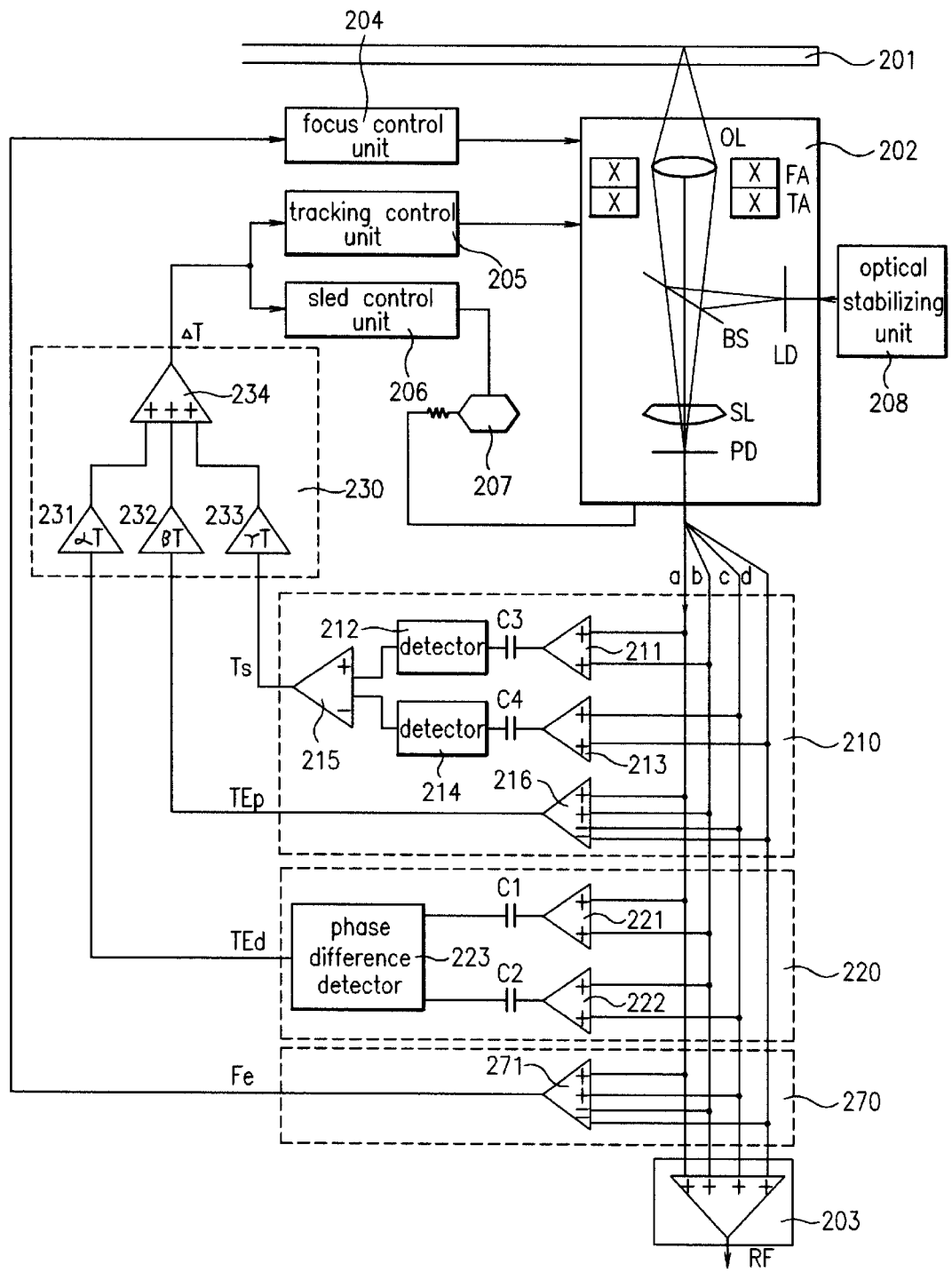

SERVO CONTROL DEVICE OF OPTICAL DISK RECORDING AND REPRODUCING APPARATUS

BACKGROUND OF THE INVENTION

1. Field of the Invention

The present invention relates to a servo control of an optical disk recording and reproducing apparatus. More particularly, the present invention relates to a servo control device of an optical disk recording and reproducing apparatus which is capable of performing tracking control and sled control by detecting radial shift indicative of a degree of deviation from the center of an objective lens in an optical pick-up unit and by detecting a tilt indicative of inclination of an optical disk, thereby achieving a good reproducing signal quality.

2. Discussion of Related Art

In general optical disk recording and reproducing apparatuses, so as to record information or reproduce the recorded information, a laser beam is connected and then scanned at a constant speed on a signal track of an optical disk. To this end, various types of control are provided such as focus control of an objective lens, tracking control, sled control of an optical pick-up unit and rotational speed control of the optical disk. A reproduction-dedicated optical disk such as, for example, a compact disk (CD) or a digital versatile disk (DVD), records an information signal on pits of sequential grooves on a spiral signal track, to thereby perform tracking control for a laser beam condensed by the optical pick-up unit along the signal track, whereby the recorded information on the optical disk can be read and reproduced.

FIG. 1 is a block diagram illustrating a construction of a servo control device of a conventional optical disk recording and reproducing apparatus. As shown in FIG. 1, a turn table 109 is driven by a motor which controls a rotational speed of an optical disk 101 and mounts the optical disk 109 on the top portion thereof, an optical pick-up unit 102 projects light to the optical disk 101 disposed on the turntable 109 and senses the reflected light to convert the sensed light into electrical signals a, b, c, d, e, and f. A reproduction signal processing unit 103 inputs the electrical signals a, b, c, d, e, and f outputted from the optical pick-up unit 102 and outputs a focus control signal Fe, a tracking control signal Te and a high frequency reproduction signal RF. A focus control unit 104 inputs the focus error signal Fe from the reproduction signal processing unit 103 and drives a focus driver FA within the optical pick-up unit 102 to thereby perform focus control. Meanwhile, a tracking control unit 105 inputs the tracking control signal Te from the reproduction signal processing unit 103 and drives a tracking driver TA within the optical pick-up unit 102 to thereby perform tracking control. Further, a sled motor control unit 106 inputs the tracking control signal Te from the reproduction signal processing unit 103 and performs a sled control operation. An optical stabilizing unit 108 serves to stabilize generation of laser light of the optical pick-up unit 102.

Preferably, the optical pick-up unit 102 includes a laser diode LD which generates the laser light, a diffraction grating GR and a beam splitter BS which produce in a three-beam manner a primary beam for reproducing data recorded on the optical disk 101 and auxiliary beams for detecting the tracking control signal using the laser light generated from the laser diode LD, an objective lens OL which condenses the three-beam form of primary and auxiliary beams projected from the beam splitter BS into the signal track of the optical disk 101, the tracking and focus drivers TA and FA which respectively perform tracking and focus control so that the objective lens OL can condense the three-beam form of primary and auxiliary beams to the signal track of the optical disk 101, a sensor lens SL which obtains a focus control signal in an astigmation manner and an optical detector PD which senses the reflected light from the optical disk 101 and outputs the sensed light to the reproduction signal processing unit 103.

In operation, when a reproduction operation starts, after the optical disk 101 is disposed on the turn table 109, the laser diode LD within the optical pick-up unit 102 generates a constant strength of laser light to perform a reading operation under control of the optical stabilizing unit 108.

The diffraction grating GR diffracts the laser light into the three-beam manner and converts the laser light into the primary beam and the auxiliary beam. At the time, the three-beam form of primary and auxiliary beams are reflected from the beam splitter BS and condensed on the objective lens OL, which are then scanned on the signal track of the optical disk 101.

A reflected light from the optical disk 101 sequentially passes through the objective lens OL and the beam splitter BS and is projected to the optical detector PD through the sensor lens SL for obtaining the focus control signal in the astigmation manner.

FIGS. 2A to 2C are diagrams illustrating a condensed state of laser light within the optical pick-up unit of FIG. 1, wherein FIG. 2A shows a condensed degree of laser light, FIG. 2B a condensed state of laser light on the optical disk and FIG. 2C an arrangement state of the optical detector. As shown in FIG. 2A, as the objective lens OL condenses the laser light of the laser diode LD, the primary beam LB for reading an information signal and the auxiliary beams LBr and LB1 for detecting the tracking control signal are each disposed, as shown in FIG. 2B, on the signal track comprised of pit rows of grooves on the optical disk 101. As a result, the reflected light on the signal recording surface of the optical disk 101 is condensed into the objective lens OL and then passes through the beam splitter BS. Thereafter, the light passed through the beam splitter BS is condensed into the optical detector PD as constructed in FIG. 2C by means of the sensor lens SL.

In the case, assuming that a track pitch indicative of an interval between signal tracks is "Tp", the auxiliary beams LBr and Lb1 are each disposed to be separated by 0.25 Tp from the signal track for reproducing the recording information.

The optical detector PD is comprised of main optical detecting elements which detect the quantity of light of the primary beam LB and auxiliary light detecting elements which the quantities of light of the auxiliary beams LBr and LBl. Here, the main optical detecting elements are PDA, PDB, PDC and PDD which are divided by a four-division form in track and radial directions of the optical disk 101, and the auxiliary light detecting elements are PDE and PDF, which are each disposed on the upper and lower ends of the main light detecting elements. The optical detecting elements PDA, PDB, PDC, PDD, PDE and PDF output electrical signals a, b, c, d, e and f, respectively, to the reproduction signal processing unit 103, to thereby produce the focus control signal Fe, the tracking control signal Te and the high frequency reproduction signal RF. In more detail, the reproduction signal processing unit 103 inputs the electrical signals a, b, c and d detected from the optical detecting elements PDA, PDB, PDC and PDD and processes the input signals with operation (a+c)−(b+d), thereby outputting the focus control signal Fe. Meanwhile, the reproduction signal processing unit 103 processes the input signals with operation (a+b+c+d), thereby outputting the high frequency reproduction signal RF. On the other hand, the reproduction signal processing unit 103 inputs the electrical signals e and f detected from the optical detecting elements PDE and PDF and processes the input signals with operation (ef), thereby outputting the tracking control signal Te.

A channel bit signal processor (not shown), which inputs the high frequency reproduction signal RF produced from the reproduction signal processing unit 103, generates a spherical wave through a zero crossing process to thereby detect a channel bit signal row. A digital signal processor (not shown) decodes and error-corrects the channel bit signal row, to thereby obtain digital information data. The digital information data is changed by various types of processes in accordance with the purpose of usage.

The focus control unit 104 processes the focus control signal Fe and drives the focus driver FA of the optical pick-up unit 102 to perform the focus control. The tracking control unit 105 processes the tracking control signal Te and drives the tracking driver TA of the optical pick-up unit 102 to perform the tracking control. Here, the optical pick-up unit 102 moves in a radial direction of the optical disk 101 in response to the tracking control signal Te. The sled control is executed by a low frequency signal of the tracking control signal Te. That is, the sled control unit 106 processes the tracking control signal Te and drives a sled driving motor 107, which causes the optical pick-up unit 102 to move in the radial direction of the optical disk 101. An example of a method for detecting the focus control signal Fe is an astigmation method, and an example of a method for detecting the tracking control signal is a three-beam method. The three-beam method is widely used because the affect of the tilt of the optical disk 101 is almost negligible and the influence of radial shift generated when the objective lens OL moves from the center of optical axis to the radial direction of the optical disk 101 is greatly minute.

Meanwhile, there has been exhibited a reproducing apparatus using a digital versatile disk DVD having a two-layer structure, so as to have a large capacity of disk, but it must have compatibility with existing compact disk.

If the two-layer structure of a disk is reproduced with the optical pick-up unit in the three-beam manner, when the three-beams incident on each layer is reflected or projected from/to the signal recording surface of the each layer, the three-beams are diffracted. Because of the interference among the three-beam, noise occurs within a reproduction signal detected by the optical detector PD. In more detail, in the case of reproducing recording information in the first layer, the three-beams projected through the first layer is reflected on the second layer and is diffracted. As a result, the three-beams become multiple beams, which are detected by each element of the optical detector PD.

On the other hand, in the case of reproducing recording information in the second layer, the three-beam reflected from the first layer is diffracted to become multiple beams, which are detected from each element of the optical detector PD. The spots of the multiple beams are condensed to the signal recording surface of the second layer. At the time, because of the interference caused among the multiple beams, the reflected light from the optical disk 101 acts as noises within the optical detector PD.

Additionally, since the pitches of the signal tracks between the compact disk CD and the digital versatile disk DVD are designed to be varied, each of three-beams can not be optimally arranged on the track of the optical disk and further can not be sufficiently controlled. So as to accommodate both disks, however, if the three-beams are disposed at a long distance from the signal track for the digital versatile disk and contrarily disposed at a short distance from the signal track for the compact disk, a sensitivity of detection of the tracking control signal is obviously decreased. In addition, since track eccentricity of the compact disk is large, when the three-beams are disposed near to the signal track, the angle between the signal track and the three-beams are reduced to considerably change the phase of the tracking control signal.

Accordingly, the digital versatile disk reproducing apparatus adopts an one-beam method, which is classified into a push-pull method and a phase difference detecting method.

However, the tracking control signal detected using the push-pull method receives much influence from the tilt of the disk and, above all, is greatly sensitive to the radial shift of the objective lens. Further, the tracking control signal is considerably affected with the depth of signal pit on the signal track. Therefore, the depth of pit increased by as much as 0.125 times the wave length of the reproduction light is greatest proper and if, however, the depth of pit becomes increased by as much as 0.25 times, the tracking control signal is not detected. Accordingly, the push-pull method can not be used in the reproducing apparatus using the digital versatile disk having a depth of pit increased by as much as 0.25 times of the detected wave length.

On the other hand, the tracking control signal detected using the phase difference detecting method does not receive any influence from the tilt of disk, but is greatly sensitive to the radial shift of the objective lens. Therefore, there is a problem in adopting a method on the reproducing apparatus using the digital versatile disk.

In the reproducing apparatus using the digital versatile disk where opening of the objective lens is reduced to accommodate the reproduction of compact disk, since the influence of radial shift of the objective lens is greatly increased upon reproducing the compact disk, there should be developed a method which is capable of removing the affect of the radial shift mixed to the tracking control signal.

SUMMARY OF THE INVENTION

Accordingly, the present invention is directed to a servo control device of an optical disk recording and reproducing apparatus that substantially obviates one or more of the problems due to limitations and disadvantages of the related art.

An object of the invention is to provide a servo control device of an optical disk recording and reproducing apparatus which adopts both a push-pull method and a phase difference detecting method using a one-beam method and converts detection signals using the above two methods into a detracking signal, thereby stably performing tracking control and sled control.

Another object of the invention is to provide a servo control device of an optical disk recording and reproducing apparatus which adopts both a push-pull method and a phase difference detecting method using an one-beam manner and converts detection signals using the above two methods into a radial shift signal and a detracking signal, thereby separately performing tracking control and sled control.

According to an aspect of the present invention, a servo control device of an optical disk recording and reproducing apparatus includes: an optical disk; an optical pick-up unit for recording information on the optical disk or for condensing light reflected from the optical disk into a plurality of divided optical detectors to thereby convert the condensed light into electrical signals; a reproduction signal output unit for adding the electrical signals outputted from the divided optical detectors within the optical pick-up unit to output an added value as a high frequency reproduction signal; a focus error detecting unit for adding the electrical signals detected from the divided optical detectors disposed in a diagonal line position of the optical pick-up unit and for obtaining a difference between the electrical signals to output the difference as a focus error signal; a push-pull signal detecting unit for adding the electrical signals detected from the divided optical detectors disposed in upper and lower sides position of the optical pick-up unit to detect by predetermined levels added values and thus to obtain a difference, thereby outputting the difference as a first push-pull signal and for adding the electrical signals detected from the divided optical detectors disposed in upper and lower sides position of the optical pick-up unit to detect by predetermined levels added values and thus to obtain a difference, thereby outputting the difference as a second push-pull signal; a phase difference detecting unit for adding the electrical signals detected from the divided optical detectors disposed in the diagonal line position of the optical pick-up unit and for comparing phases of added values to thereby output a phase difference detecting signal; and a tracking signal operation unit for amplifying by predetermined levels and adding the first and second push-pull signals from the push-pull signal detecting unit and the phase difference detecting signal from the phase difference detecting unit to thereby generate a detracking signal, thereby performing tracking control and sled motor control.

According to another aspect of the present invention, a servo control device of an optical disk recording and reproducing apparatus includes: an optical disk; an optical pick-up unit for recording information on the optical disk or for condensing light reflected from the optical disk into a plurality of divided optical detectors to thereby convert the condensed light into electrical signals; a reproduction signal output unit for adding the electrical signals outputted from the divided optical detectors within the optical pick-up unit to output an added value as a high frequency reproduction signal; a focus error detecting unit for adding the electrical signals detected from the divided optical detectors disposed in a diagonal line position of the optical pick-up unit and for obtaining a difference between the electrical signals to output the difference as a focus error signal; a push-pull signal detecting unit for adding the electrical signals detected from the divided optical detectors disposed in upper and lower sides position of the optical pick-up unit to detect by predetermined levels added values and thus to obtain a difference, thereby outputting the difference as a first push-pull signal and for adding the electrical signals detected from the divided optical detectors disposed in upper and lower sides position of the optical pick-up unit to detect by predetermined levels added values and thus to obtain a difference, thereby outputting the difference as a second push-pull signal; a phase difference detecting unit for adding the electrical signals detected from the divided optical detectors disposed in the diagonal line position of the optical pick-up unit and for comparing phases of added values to thereby output a phase difference detecting signal; a tracking signal operation unit for respectively amplifying by predetermined levels and adding the first and second push-pull signals from the push-pull signal detecting unit and the phase difference detecting signal from the phase difference detecting unit to thereby generate a detracking signa, thereby performing tracking control; and a radial shift signal operation unit for respectively amplifying by predetermined levels and adding the first and second push-pull signals from the push-pull signal detecting unit and the phase difference detecting signal from the phase difference detecting unit to thereby generate a radial shift signal, thereby performing sled control.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the drawings.

In the drawings:

FIGS. 2A to 2C are diagrams illustrating a condensed state of laser light within the optical pick-up unit of FIG. 1, wherein FIG. 2A shows a condensed degree of laser light, FIG. 2B a condensed state of laser light on the optical disk and FIG. 2C an arrangement state of the optical detector;

FIG. 3 is a block diagram illustrating a construction of a servo control device of an optical disk recording and reproducing apparatus according to an embodiment of the present invention;

DETAILED DESCRIPTION OF PREFERRED EMBODIMENTS

Figure 1:
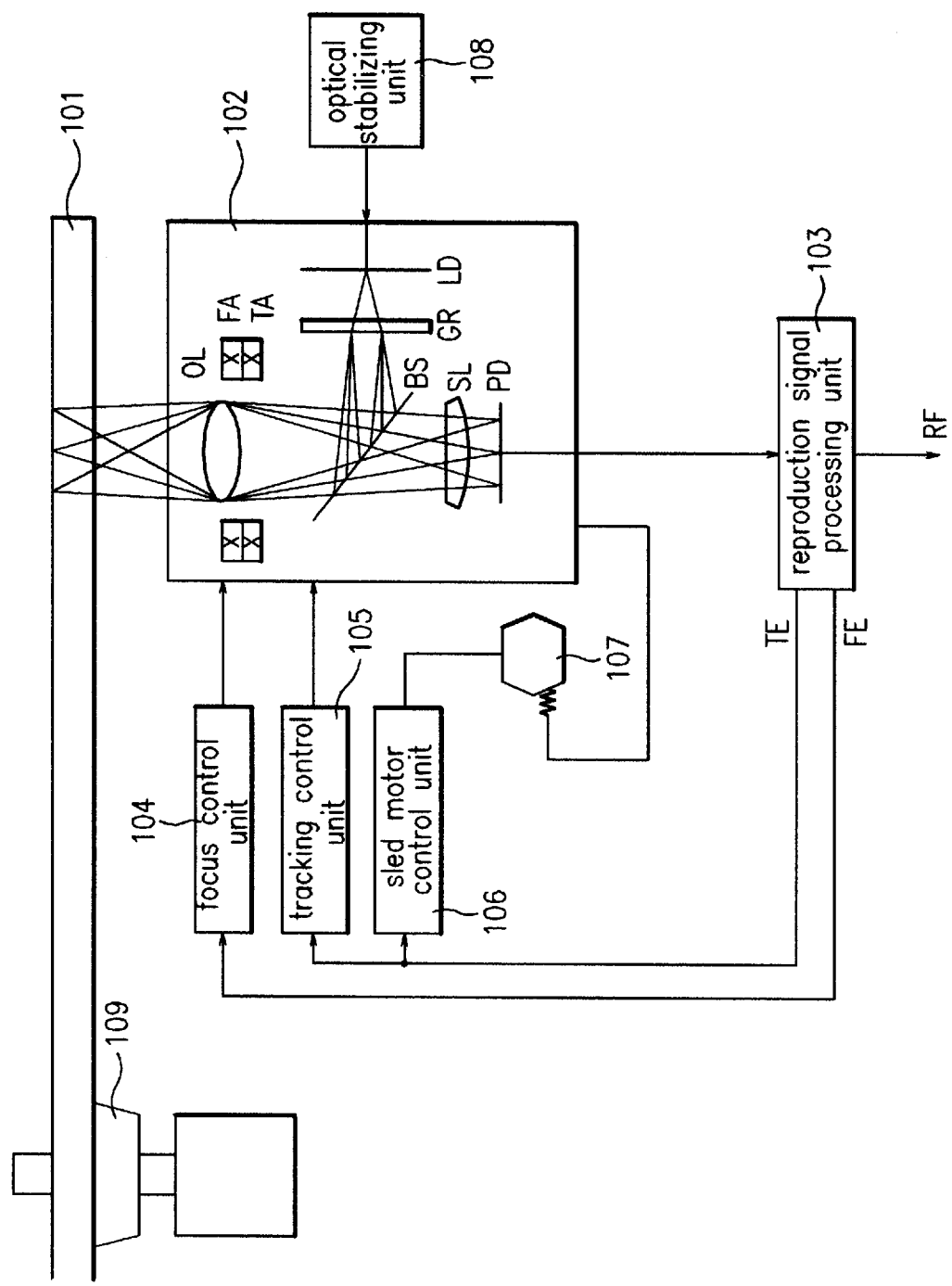
FIG. 1 is a block diagram illustrating a construction of a servo control device of a conventional optical disk recording and reproducing apparatus.
Figure 2A:
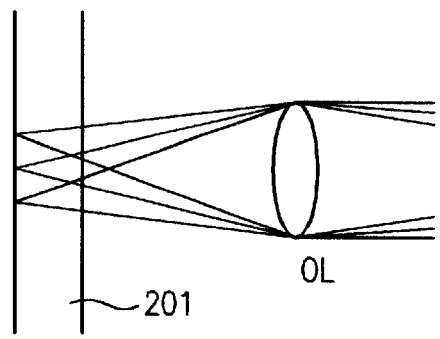
Figure 2B:
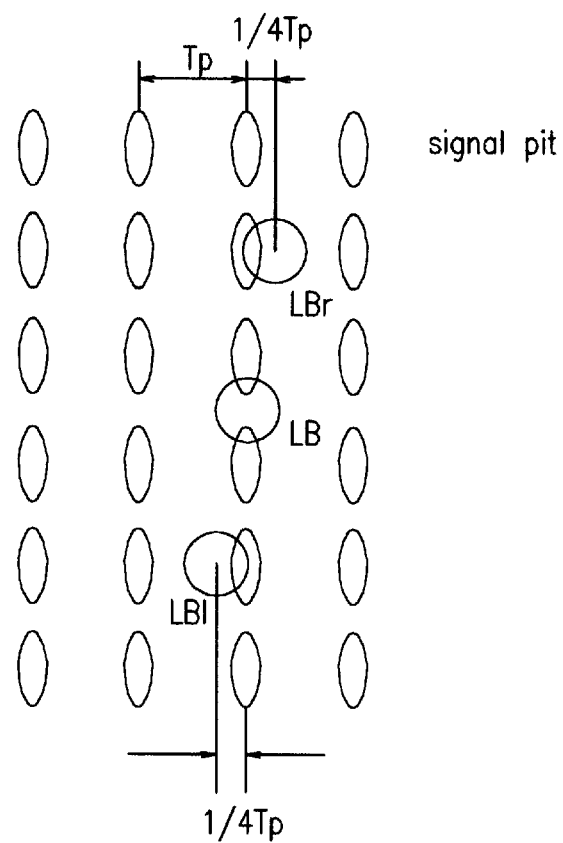
Figure 2C:
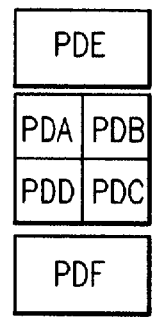

Reference will now be made in detail to the preferred embodiments of the present invention, examples of which are illustrated in the accompanying drawings.

In the preferred embodiment of the present invention, an axis direction of a sensor lens SL against an optical detector PD has an angle of 45° to a signal track direction, and a focus of the sensor lens SL is disposed on the front and rear of the optical detector PD, respectively.

Namely, an optical path of a laser beam is changed in left and right directions in accordance with the axis direction of sensor lens SL against the optical detector PD and a perpendicular axis disposed at the front of the optical detector PD.

To detect push-pull signals from the left and right of the signal track of optical disk, the optical detector PD rotaries by an angle of 90° and detects the push-pull signals Ts and TEp from the front and rear in the signal track direction of optical disk. When the push-pull signals are detected, an influence is inevitably generated due to disk tilt of the signal track direction. At that time, the disk tilt of the signal track direction has a great affect on the high frequency reproduction signal RF, and since the influence of optical detector PD is varied according to the front and rear directions of the signal track, a primary signal for detecting a disk tilt signal of the signal track direction can be detected.

Namely, the optical detector PD is divided into front and rear areas of the signal track, and only high frequency signals within the two signals detected from the front and rear areas are detected, to thereby obtain the primary signal by comparing the sizes of the high frequency signals.

the tilt of signal track direction of the optical disk has a great influence on a high frequency amplitude of the push-pull signal, while the influence due to detracking is mixed.

Namely, a low frequency amplitude of the push-pull signal TEp detected using the push-pull method from the optical detector PD on the front and rear of the signal track direction is greatly affected by the radial shift of disk, which becomes a primary signal for detecting a radial shift signal. And, a phase difference detecting signal TEd detected using the phase difference detecting method is minutely affected by any other signal, which becomes a primary signal for detecting the detracking signal. The high frequency amplitude of the push-pull signal Ts is considerably sensitive to the variation of tilt of signal track direction of the optical disk, but somewhat receives the influence due to detracking, which becomes a primary signal for detecting a disk tilt signal in the signal track direction. In more detail, the high frequency amplitude of the push-pull signal Ts almost does not receive influence by the detracking, but is very sensitive to the variation of the tilt of signal track direction.

In particular, since the digital versatile disk has a pit depth of 25 times the wave length of laser light, the signals detected using the push-pull method are not affected by a detracking signal ΔT representing a deviation degree of a reproduction beam from the signal track. Meanwhile, in the case where the compact disk is reproduced in the reproducing apparatus using the digital versatile disk, since the disk has the same pit depth, the push-pull signals TEp and Ts detected using the push-pull method are not affected.

In the present invention, therefore, the detracking signal AT and a radial shift signal ΔR, where influence due to the tilt of disk is removed, can be detected by detecting the disk tilt signal, which are each used for the purpose of the tracking control and the sled control.

The above-mentioned tracking control signals TEd, TEp and Ts are function of this detracking signal ΔT representing a deviation degree of a reproduction beam from the signal track, the radial shift signal ΔR indicating a deviated degree of objective lens from the center of disk and a tilt signal ΔTt indicative of a tilted degree of disk including an optical system.

In this case, the absolute value of the radial shift signal ΔR of objective lens does not exceed 100 m, and an angle of the tilt signal ΔTt of disk does not exceed 0.10°.

A variation amount of signal of the optical detector PD due to the variation of the radial shift signal ΔR and the tilt signal ΔTt is varied within 10% of the whole variation amount, and in the case of performing the tracking control, the detracking signal ΔT has a low variation amount.

Namely, the interference caused by the detected tracking control signals TEp, TEd and Ts is considerably weak and since the signals are linearly varied in a small area, the detected signals TEp, TEd and Ts are given by the following equations:

$$\Delta T, \Delta R, \Delta Tt) = Ap*\Delta T + Bp*\Delta R + Cp*\Delta Tt \tag{1}$$

$$TEd(\Delta T, \Delta R, \Delta Tt) = Ad*\Delta T + Bd*\Delta R + Cd*\Delta Tt \tag{2}$$

$$Ts(\Delta T, \Delta R, \Delta Tt) = As*\Delta T + Bs*\Delta R + Cs*\Delta Tt \tag{3}$$

wherein coefficients A, B and C each represent detecting sensitivities to the signals ΔT, ΔR and ΔTt.

Since, generally, a value of Bs*ΔR is greatly lower than the values of As*ΔT and Cs*ΔTt, it can be assumed that Bs ="O", and in the case of using the phase difference detecting method, since no influence due to the tilt of disk exists, it can be assumed that Cd="O". Further, a value of Cp*ΔTt is lower than that of Bp*ΔR and Bd/Ad is relatively lower than Bp/Ap.

Therefore, each displacement from the equations (1) to (3) can be detected by the following equations (4) and (5):

$$\Delta T = \alpha T*TEd + \beta T*TEp + \gamma T*Ts \tag{4}$$

$$\Delta R = \alpha R*TEd + \beta R*TEp + \gamma R*Ts \tag{5}$$

From these equations, the following equations are given:

$$\beta T = Bd*Cs/(Ap*Bd*Cs - As*Bd*Cp - Ad*Bp*Cs) \tag{7}$$

$$\alpha T = -Bp*Cs/(Ap*Bd*Cs - As*Bd*Cp - Ad*Bp*Cs) \tag{6}$$

$$\gamma T = -Bd*Cp/(Ap*Bd*Cs - As*Bd*Cp - Ad*Bp*Cs) \tag{8}$$

$$\alpha R = -As*Cp/(Ap*Bd*Cs - As*Bd*Cp - Ad*Bp*Cs.) \tag{9}$$

$$\beta R = (Ap*Cs - Ad*Cs)/(Ap*Bd*Cs - As*Bd*Cp - Ad*Bp*Cs.) \tag{10}$$

$$\gamma R = Ad*Cp/(Ap*Bd*Cs - As*Bd*Cp - Ad*Bp*Cs) \tag{11}$$

Accordingly, the converted signals ΔT and ΔR which are free from the influence of the tilt of disk can be detected to perform the tracking control and the sled control.

FIG. 3 is a block diagram illustrating a construction of a servo control device of an optical disk recording and reproducing apparatus according to an embodiment of the present invention. In that construction, the servo control device includes: an optical disk 201; an optical pick-up unit 202 for recording information on the optical disk 201 or for condensing light reflected from the optical disk 201 to convert the condensed light into electrical signals a, b, c and d; an optical stabilizing unit 208 for stabilizing generation of laser light of the optical pick-up unit 202; a reproduction signal output unit 203 for adding (a+b+c+d) the electrical signals a, b, c, and d outputted from the optical pick-up unit 202 to output an added value as a high frequency reproduction signal RF; a push-pull signal detecting unit 210 for adding (a+b), (c+d) the electrical signals (a, b) and (c, d) outputted from the optical pick-up unit 202 to detect by predetermined levels added values and thus to obtain a difference, thereby outputting the difference as a first push-pull signal Ts and simultaneously for adding (a+b), (c+d) the electrical signals (a, b) and (c, d) to output the difference as a second push-pull signal TEp; a phase difference detecting unit 220 for adding the electrical signals (a, c) and (b, d) outputted from the optical pick-up unit 202 and for performing operation of added values to thereby output a phase difference detecting signal TEd; a focus error detecting unit 270 for adding the electrical signals (a, c) and (b, d) outputted from the optical pick-up unit 202 and for obtaining a difference from added values to thereby output the difference as a focus error signal Fe; a tracking signal operation unit 230 for respectively amplifying by predetermined gains αT, βT,γT and adding the first and second push-pull signals Ts and TEp from the push-pull signal detecting unit 210 and the phase difference detecting signal TEd from the phase difference detecting unit 220 to thereby generate a detracking signal ΔT; a tracking control unit 205 for controlling a tracking driver TA of the optical pick-up unit 202 to adjust a tracking error in accordance with the detracking signal ΔT of the tracking signal operation unit 230; a sled control unit 206 for driving a sled motor 207 to move the optical pick-up unit 202 into an arbitrary position on the optical disk 201 in accordance with the detracking signal ΔT of the tracking signal operation unit 230; and a focus control unit 204 for controlling a focus driver FA of the optical pick-up unit 202 to adjust a focus error in accordance with the focus error signal Fe of the focus error detecting unit 270.

Preferably, the optical pick-up unit 202 includes a laser diode LD which generates the laser light, a beam splitter BS which separates incidence light and reflection light, an objective lens OL which condenses the beam projected from the beam splitter BS to a signal track of the optical disk 201, the tracking and focus drivers TA and FA which respectively perform tracking and focus driving operation so that the objective lens OL can condense the beam on the signal track of the optical disk 201, a sensor lens SL which obtains the focus control signal in an astigmation manner and an optical detector PD which senses the reflected light from the optical disk 201 and outputs the sensed light as the electrical signals a, b, c and d.

The optical detector PD is comprised of optical detecting elements PDA, PDB, PDC and PDD which are divided by a four-division form in track and radial directions of the optical disk 201, each optical detecting element outputting the electrical signals a, b, c and d, respectively.

The push-pull signal detecting unit 210 is comprised of a first adder 211 for adding the electrical signals a and b from the optical pick-up unit 202, a first condenser C3 for cutting a low frequency component from an output signal of the first adder 211, a first detector 212 for inputting a high frequency signal where the low frequency component is cut by the first condenser C3 and for detecting the input signal, a second adder 213 for adding the electrical signals c and d from the optical pick-up unit 202, a second condenser C4 for cutting a low frequency component from an output signal of the second adder 213, a second detector 214 for inputting a high frequency signal where the low frequency component is cut by the second condenser C4 and for detecting the input signal, a third adder 215 for inputting output signals from the first and second detectors 212 and 214 to obtain a difference component, thereby outputting the difference component as the first push-pull signal Ts, and a fourth adder 216 for adding the electrical signals a, b and c, d from the optical pick-up unit 202 to obtain a difference component (a+b)−(c+d), thereby outputting the difference component as the second push-pull signal TEp.

The phase difference detecting unit 220 is comprised of a first adder 221 for adding the electrical signals a and c from the optical pick-up unit 202, a first condenser Cl for cutting a low frequency component from an output signal of the first adder 221, a second adder 222 for adding the electrical signals b and d from the optical pick-up unit 202, a second condenser C2 for cutting a low frequency component from an output signal of the second adder 222, and a phase difference detector 223 for inputting output signals where the low frequency components are cut by the first and second condensers Cl and C2, to output the phase difference detecting signal TEd.

The focus error detecting unit 270 is comprised of an adder 271 for adding (a+c) and (b+d) the electrical signals (a,c) and (b,d) outputted from the optical pick-up unit 202 to obtain a difference component (a+c)−(b+d), thereby outputting the difference component as the focus error signal Fe.

The tracking signal operation unit 230 includes first to third amplifiers 231 to 233 for respectively amplifying by predetermined gains αT,βT,γT the phase difference detecting signal TEd from the phase difference detecting unit 220 and the second and first push-pull signals TEp and Ts from the push-pull signal detecting unit 210 and an adder 234 for adding output signals from the first to third amplifiers 231 to 233 to thereby output the detracking signal ΔT to the tracking control unit 205 and the sled control unit 206.

Under the above construction, the optical stabilizing unit 208 controls the quantity of light of the laser diode LD according to the record/reproduction. Upon recording, the quantity of light is modulated by a recording signal modulated to be adapted to be recorded in the optical disk 201, upon reproducing, the quantity of light is constant, and upon halting, the quantity of light is "0".

Accordingly, the laser light emitted from the laser diode LD under the control of the optical stabilizing unit 208 is reflected from the beam splitter BS and then condensed on the objective lens OL. The condensed laser beam is disposed onto the signal track having pit rows of grooves on the optical disk 201.

Meanwhile, the light reflected from the signal recording surface of the optical disk 201 is condensed on the objective lens OL and then passes through the beam splitter BS. Next, the light is finally condensed to the optical detecting unit PD by means of the sensor lens SL.

Figure 4:
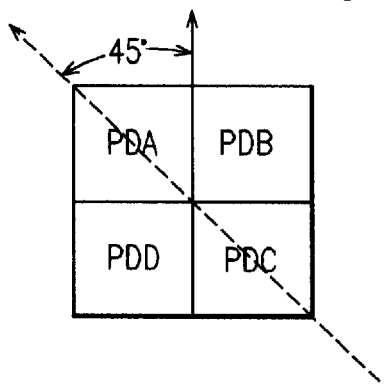
FIG. 4 is a view illustrating an arrangement of an optical detector of FIG. 3.

As shown in FIG. 4, the optical detector PD outputs the electrical signals a, b, c and d proportional to the quantity of light obtained from the optical detecting elements PDA, PDB, PDC and PDD to the reproduction signal output unit 203, the push-pull signal detecting unit 210, the phase difference detecting unit 220 and the focus error detecting unit 270, respectively. The reproduction signal output unit 203 adds the electrical signals a, b, c and d outputted from the optical pick-up unit 202 by means of an adder, to thereby generate the high frequency reproduction signal RF, which can obtain the recorded information by a digital signal process.

When the electrical signals a, b, c and d outputted from the optical pick-up unit 202 are outputted, the first adder 221 of the phase difference detecting unit 220 adds the signals a, c and the first condenser Cl cuts the low frequency component from an added value. Then, the high frequency signal is outputted to the phase difference detector 223. In the same manner as the above, the second adder 222 of the phase difference detecting unit 220 adds the signals b, d and the second condenser C2 cuts the low frequency component from an added value. Then, the high frequency signal is outputted to the phase difference detector 223.

The fourth adder 216 of the push-pull signal detecting unit 210 adds (a+b−c−d) the electrical signals to output the added value as the second push-pull signal TEp.

At the same time, the first adder 211 of the push-pull signal detecting unit 210 adds (a+b) the electrical signals a and b and the first condenser C3 cuts the low frequency component from an added value. Then, the high frequency signal is outputted to the first detector 212, where the size of high frequency signal is detected to thereby output the detected result to the third adder 215. Meanwhile, the second adder 213 of the push-pull signal detecting unit 210 adds (c+d) the electrical signals c and d and the second condenser C4 cuts the low frequency component from an added value. Then, the high frequency signal is outputted to the second detector 214, where the size of high frequency signal is detected to thereby output the detected result to the third adder 215. The third adder 215 obtains a difference between the sizes of high frequency signals detected from the first and second detectors 212 and 214 and outputs the difference as the first push-pull signal Ts.

The adder 271 of the focus error detecting unit 270 adds (a+c−b−d) the electrical signals, to thereby output the added value as the focus error signal Fe.

Figure 5:
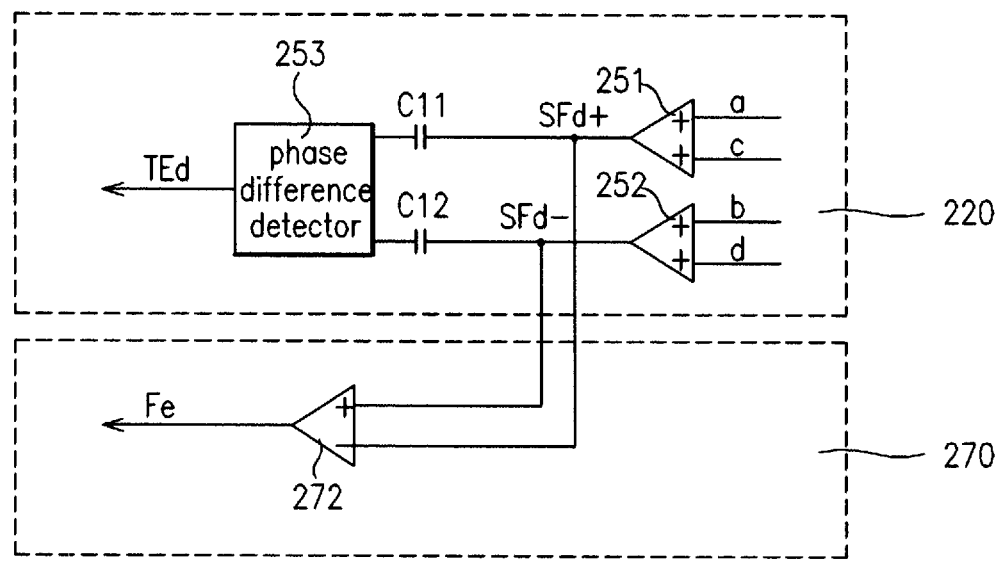
FIG. 5 is a circuit diagram illustrating another embodiment of a phase difference detecting unit and a focus error detecting unit of FIG. 3.

FIG. 5 is a circuit diagram illustrating another embodiment of the phase difference detecting unit 220 and the focus error detecting unit 270 of FIG. 3. Referring to FIG. 5, the phase difference detecting unit 220 is comprised of a first adder 251 for adding (a+c) the electrical signals a and c from the optical pick-up unit 202, a first condenser C11 for cutting a low frequency component from an output signal of the first adder 251, a second adder 252 for adding (b+d) the electrical signals b and d from the optical pick-up unit 202, a second condenser C12 for cutting a low frequency component from an output signal of the second adder 252, and a phase difference detector 253 for inputting output signals where the low frequency components are cut by the first and second condensers C11 and C12, to thereby output an input signal as the phase difference detecting signal TEd.

The focus error detecting unit 270 is comprised of an adder 272 for obtaining a difference component (SFd+−SFd−) from output signals SFd+ and SFd− of the first and second adders 251 and 252 to thereby output the difference component as the focus error signal Fe.

In operation, when the electrical signals a, b, c and d outputted from the optical pick-up unit 202 are outputted, the first adder 251 of the phase difference detecting unit 220 adds the signals a, c and outputs the output signal SFd+. Then, the first condenser C11 cuts the low frequency component from the output signal SFd+ and outputs the high frequency signal to the phase difference detector 253. In the same manner as the above, the second adder 252 of the phase difference detecting unit 220 adds the signals b, d and outputs the output signal SFd−. Then, the second condenser C12 cuts the low frequency component from the output signal SFd− and outputs the high frequency signal to the phase difference detector 253. The phase difference detector 253 obtains a phase difference between the high frequency signals from the adders 251 and 252, to thereby output the phase difference as the phase difference detecting signal TEd.

The adder 272 of the focus error detecting unit 270 inputs the output signals SFd+ and SFd− of the first and second adders 251 and 252 to obtain the difference component (SFd+−SFd−) and outputs the difference component as the focus error signal Fe.

Figure 6:
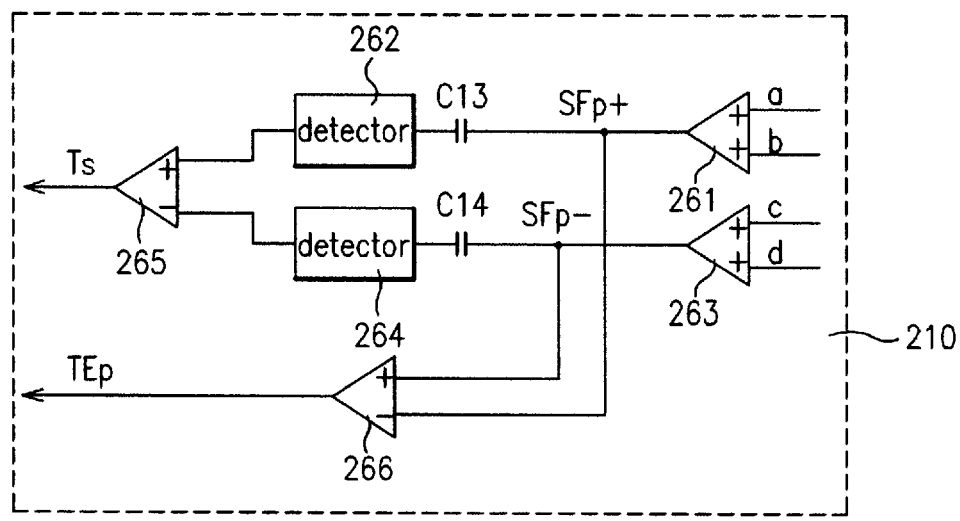
FIG. 6 is a circuit diagram illustrating another embodiment of a push-pull signal detecting unit of FIG. 3.

FIG. 6 is a circuit diagram illustrating another embodiment of the push-pull signal detecting unit 210 of FIG. 3. In construction, there are provided a first adder 261 for adding (a+b) the electrical signals a and b from the optical pick-up unit 202, a first condenser C13 for cutting a low frequency component from an output signal SFp+ of the first adder 261, a first detector 262 for inputting a high frequency signal where the low frequency component is cut by the first condenser C13 and for detecting the input signal, a second adder 263 for adding (c+d) the electrical signals c and d from the optical pick-up unit 202, a second condenser C14 for cutting a low frequency component from an output signal SFp− of the second adder 263, a second detector 264 for inputting a high frequency signal where the low frequency component is cut by the second condenser C14 and for detecting the input signal, a third adder 265 for inputting output signals from the first and second detectors 262 and 264 to obtain a difference component, thereby outputting the difference component as the first push-pull signal Ts, and a fourth adder 266 for inputting the output signals SFp+ and SFp− from the adders 261 and 263 to obtain a difference component (SFp+SFp−), thereby outputting the difference component as the second push-pull signal TEp.

In operation, the first adder 261 of the push-pull signal detecting unit 210 adds the electrical signals a and b from the optical pick-up unit 202 to thereby obtain the output signal SFp+. Then, the first condenser C13 cuts the low frequency component from the output signal SFp+, to thereby output the high frequency signal to the first detector 262. Next, the first detector 262 detects the amplitude of the high frequency signal, to thereby output the detected result to the third adder 265. In the same manner as the above, the second adder 263 of the push-pull signal detecting unit 210 adds the electrical signals c and d from the optical pick-up unit 202, to thereby obtain the output signal SFp−. Then, the first condenser C14 cuts the low frequency component from the output signal SFp− to output the high frequency signal to the second detector 264. Next, the second detector 264 detects the amplitude of the high frequency signal, to thereby output the detected result to the third adder 265. The third adder 265 obtains an amplitude difference between the detected signals from the detectors 262 and 264 to thereby output the difference as the first push-pull signal Ts.

The fourth adder 266 inputs the output signals SFp+ and SFp− from the adders 261 and 263 to obtain a difference component (SFp+−SFp−), thereby outputting the difference component as the second push-pull signal TEp.

The tracking signal operation unit 230 inputs the phase difference detecting signal TEd from the phase difference detecting unit 220 and the first and second push-pull signals Ts and TEp from the push-pull signal detecting unit 210 and converts the input signals into the above equations (4), thereby to obtain the detracking signal $\Delta T$. Namely, the first to third amplifiers 231 to 233 of the tracking signal operation unit 230 respectively amplify by predetermined gains $\alpha T, \beta T, \gamma T$ the detection signals TEd, TEp and Ts, and the adder 234 adds the amplified signals from the amplifiers 231 to 233 to thereby output the detracking signal $\Delta T = \alpha T^* TEd + \beta T^* TEp + \gamma T^* Ts$ to the tracking control unit 205 and the sled control unit 206.

At chat time, the detracking signal $\Delta T$, which is not affected by the radial shift of the objective lens OL and the tilt of the disk 201, indicates a degree of deviation from the signal track.

The tracking control unit 205 inputs the detracking signal $\Delta T$ and performs the tracking control by driving the tracking driver TA within the optical pick-up unit 202. Simultaneously, the sled control unit 206 inputs the detracking signal $\Delta T$ and performs the sled control by driving the sled motor 207. Meanwhile, the focus control unit 204 inputs the focus error signal Fe of the focus error detecting unit 270 and corrects a focus error by driving the focus driver FA within the optical pick-up unit 202.

Figure 7:
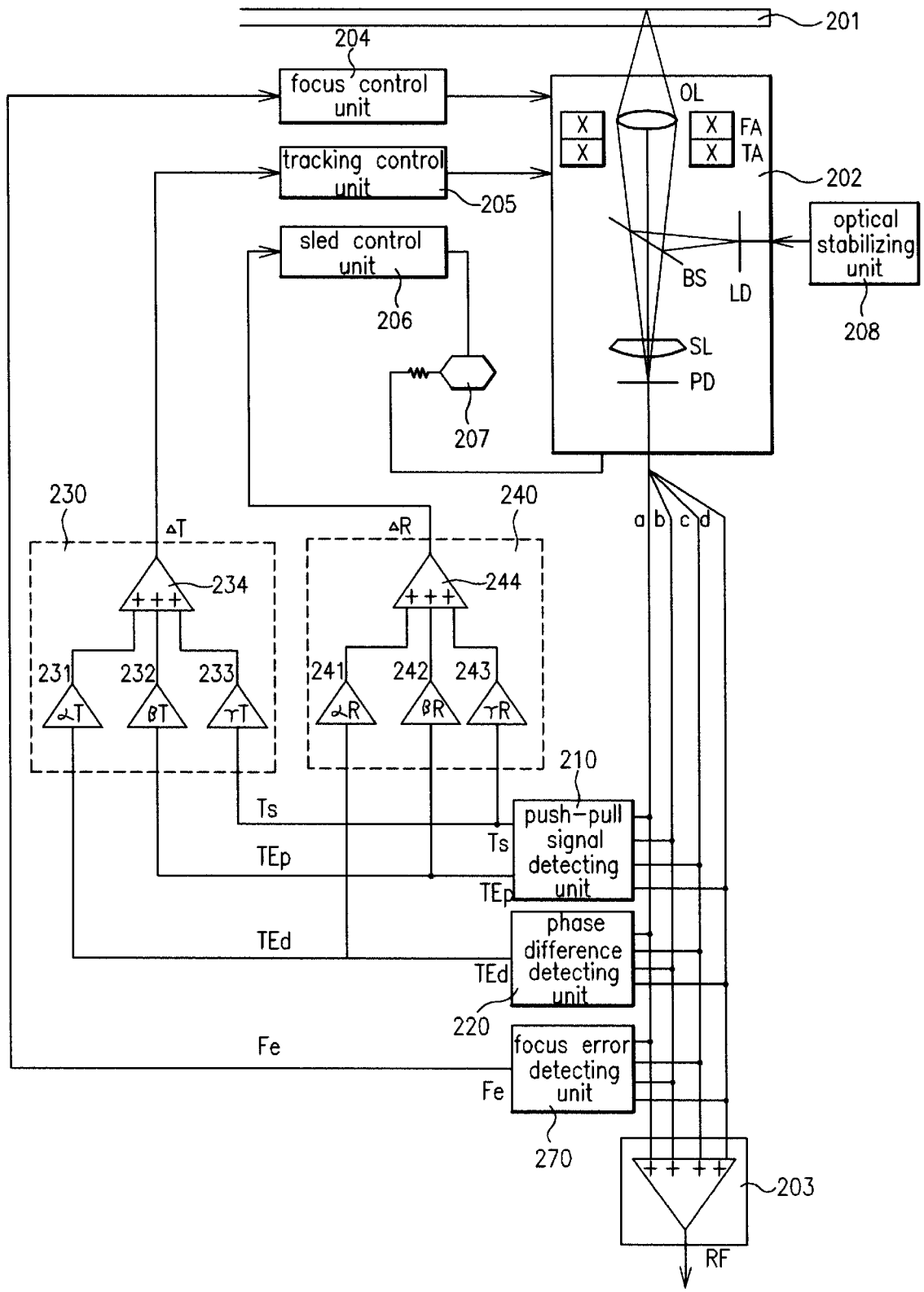
FIG. 7 is a block diagram illustrating a construction of a servo control device of an optical disk recording and reproducing apparatus according to another embodiment of the present invention.

FIG. 7 is a block diagram illustrating a construction of a servo control device of an optical disk recording and reproducing apparatus according to another embodiment of the present invention. In construction, the servo control device includes: an optical disk 201; an optical pick-up unit 202 for recording information on the optical disk 201 or for condensing light reflected from the optical disk 201 to convert the condensed light into electrical signals a, b, c and d; an optical stabilizing unit 208 for stabilizing generation of laser light of the optical pick-up unit 202; a reproduction signal output unit 203 for adding (a+b+c+d) the electrical signals a, b, c, and d outputted from the optical pick-up unit 202 and for outputting an added value as a high frequency reproduction signal RF; a push-pull signal detecting unit 210 for adding (a+b) and (c+d) the electrical signals (a, b) and (c, d) outputted from the optical pick-up unit 202 to detect at a predetermined level added values and thus to obtain a difference, thereby outputting the difference as a first push-pull signal Ts and simultaneously for adding (a+b) and (c+d) the electrical signals (a, b) and (c, d) to output the difference as a second push-pull signal TEp; a phase difference detecting unit 220 for adding the electrical signals (a, c) and (b, d) outputted from the optical pick-up unit 202 and for performing operation of added values to thereby output a phase difference detecting signal TEd; a focus error detecting unit 270 for adding the electrical signals (a, c) and (b, d) outputted from the optical pick-up unit 202 and for obtaining a difference from added values to output the difference as a focus error signal Fe; a tracking signal operation unit 230 for respectively amplifying by predetermined gains $\gamma T, \beta T, \alpha T$ and adding the first and second push-pull signals Ts and TEp from the push-pull signal detecting unit 210 and the phase difference detecting signal TEd from the phase difference detecting unit 220 to thereby generate a detracking signal $\Delta AT$; a radial shift signal operation unit 240 for respectively amplifying by predetermined gains $\gamma R, \beta R, \alpha R$ and adding the first and second push-pull signals Ts and TEp from the push-pull signal detecting unit 210 and the phase difference detecting signal TEd from the phase difference detecting unit 220 to thereby generate a radial shift signal $\Delta R$; a tracking control unit 205 for controlling a tracking driver TA of the optical pick-up unit 202 to adjust a tracking error in accordance with the detracking signal $\Delta T$ of the tracking signal operation unit 230; a sled control unit 206 for driving a sled motor 207 to move the optical pick-up unit 202 into an arbitrary position on the optical disk 201 in accordance with the radial shift signal $\Delta R$ of the radial shift signal operation unit 240; and a focus control unit 204 for controlling a focus driver FA of the optical pick-up unit 202 to adjust a focus error in accordance with the focus error signal Fe of the focus error detecting unit 270.

In the preferred embodiment according to the present invention, the optical pick-up unit 202, the optical detecting unit PD, and the tracking signal operation unit 230 have the same construction as FIG. 3, the phase difference detecting unit 220 and the focus error detecting unit 270 have the same construction as FIG. 3 or FIG. 5, and the push-pull signal detecting unit 210 has the same construction as FIG. 3 or FIG. 6.

Preferably, the radial shift signal operation unit 240 is comprised of first to third amplifiers 241 to 243 for respectively amplifying by predetermined gains $\alpha R, \beta R, \gamma R$ the phase difference detecting signal TEd from the phase difference detecting unit 220 and the output signals TEp and Ts from the push-pull signal detecting unit 210 and an adder 244 for adding the amplified output signals to thereby output the radial shift signal $\Delta R$ to the sled control unit 206.

Under the construction as mentioned in the above, the detection signals TEd, TEp and Ts can be converted into the above equations (4) and (5), thereby to obtain the detracking signal $\Delta T$ and the radial shift signal $\Delta R$. An explanation of such an operation will be hereinafter discussed.

When the electrical signals a, b, c and d from the optical pick-up unit 202 are outputted, the push-pull signal detecting unit 210 outputs the first and second push-pull signals Ts and TEp, in the same manner as FIG. 3 or FIG. 6, and the phase difference detecting unit 220 outputs the phase difference detecting signal TEd, in the same manner as FIG. 3 or FIG. 5.

At that time, the first to third amplifiers 231 to 233 of the tracking signal operation unit 230 respectively amplify by predetermined gains $\alpha T, \beta T, \gamma T$ the detection signals TEd, TEp and Ts, and the adder 234 adds the amplified signals from the amplifiers 231 to 233 to thereby output the detracking signal $\Delta T = \alpha T^* TEd + \beta T^* TEp + \gamma T^* Ts$ to the tracking control unit 205.

Meanwhile, the first to third amplifiers 241 to 243 of the radial shift signal operation unit 240 respectively amplify by predetermined gains $\alpha R, \beta R, \gamma R$ the detection signals TEd, TEp and Ts, and the adder 244 adds the amplified signals from the amplifiers 241 to 243 to thereby output the radial shift signal $\Delta R = \alpha TR^* TEd + \beta R^* TEp + \gamma R^* Ts$ to the sled control unit 206.

At that time, the detracking signal $\Delta T$ as the tracking control signal indicates the deviated degree from the signal track which is free from an external impact. The radial shift signal $\Delta R$ as the sled control signal represents the deviated degree from the center of the objective lens OL.

As a result, the detracking signal $\Delta T$, which is not affected by the radial shift of the objective lens OL and the tilt of the disk 201, is accurately detected, and the radial shift signal $\Delta R$ of the objective lens OL, which is not affected by the detracking and the tilt of the disk 201, is also detected. Accordingly, an accurate servo control can be achieved by the detracking signal $\Delta T$ and the radial shift signal $\Delta R$.

In the preferred embodiment of FIG. 7, the tracking control is performed by the detracking signal $\Delta T$, and the sled control is performed by the radial shift signal $\Delta R$.

Meanwhile, in case of reproducing only the disk 201 having the depth of pit increased by as much as 0.25 times of light wave length, the tracking control signal is not detected, but since there exists the influence caused by the radial shift, the tracking control signal can be detected by the push-pull method. Even in case of reproducing the compact disk, since the depth of pit of the disk is 0.25 wave length, the value of Ap is "0" and the value of As is "0" in the above equations (1) to (3).

Therefore, in case of reproducing both the digital versatile disk and compact disk in the DVD-dedicated optical system, the equations (4) and (5) can be obtained, from which the detracking signal $\Delta T$ and the radial shift signal $\Delta R$ can be detected.

Namely, the detracking signal $\Delta T$ and the radial shift signal $\Delta R$ obtain each displacement from the following equations:

$$\Delta R = (1/Bp) * TEp - \{Cp/(Cs * Bp)\} * Ts = \qquad (12)$$

$$(1/Bp) * \{TEp - (Cp/Cs) * Ts\}$$

$$\Delta T = (1/Ad) * TEd - \{Bd/(Ad/Bp)\} * TEp + \qquad (13)$$

$$\{Cp/(Ad * Bp * Cs)\} * Ts = (1/Ad) * [TEd - (Bd/Bp) * \{TEp -$$

$$(Cp/Cs) * Ts\}] = (1/Ad) * (TEd - Bd * \Delta R)$$

In the above equations, assuming that the value of Ad is "1" and the Bd = "1", the detracking signal $\Delta T$ and the radial shift signal $\Delta R$ are given by the following equations:

$$\Delta R = TEd - (Cp/Cs) * Ts = TEp + \gamma R' * Ts \quad (14)$$

$$\Delta T = TEd - Bd * TEp + (Cp/Cs) * Ts = TEd + \beta T * TEp +$$

$$\gamma T * Ts = TEd - Bd * \Delta R = TEd + \delta * \Delta R \quad (15)$$

Accordingly, in the DVD reproducing apparatus which reproduces only the disk 201 having the depth of signal pit increased by as much as 0.25 times of light wave length, the detracking signal ΔT and the radial shift signal ΔR can be simply obtained from the detection signals TEd, TEp and Ts. Namely, in the case where the preferred embodiment as described in FIG. 7 is embodied in the reproducing apparatus using the digital versatile disk, the detracking signal ΔT and the radial shift signal ΔR can be obtained by the circuit construction of FIG. 8 or FIG. 9.

Figure 8:
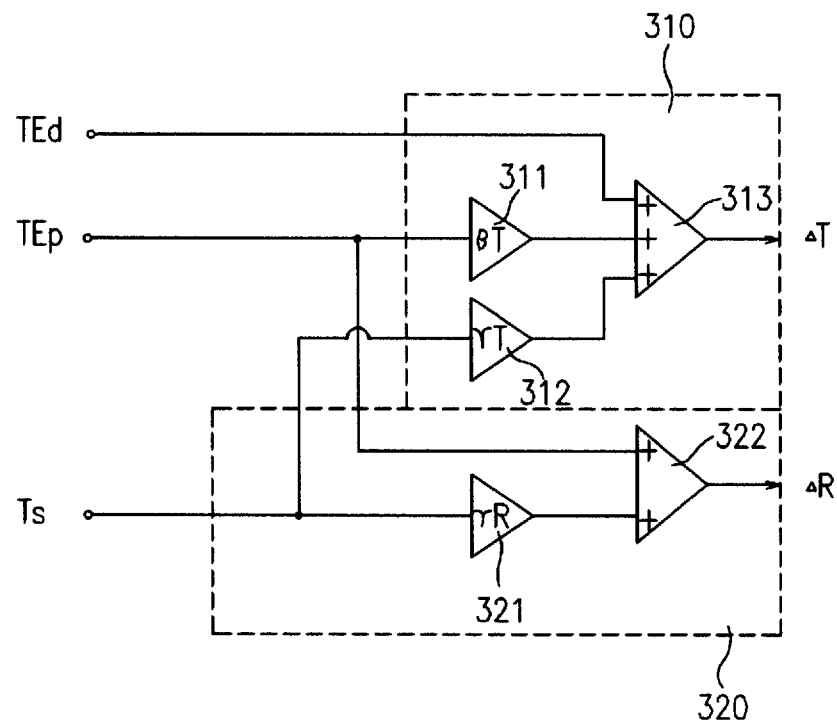
FIG. 8 is a circuit diagram illustrating another embodiment of a tracking signal operation unit and a radial shift signal operation unit of FIG. 7.

FIG. 8 is a circuit diagram illustrating another embodiment of a tracking signal operation unit and a radial shift signal operation unit of FIG. 7. Referring to FIG. 8, a tracking signal operation unit 310 is comprised of second and first amplifiers 312 and 311 for respectively amplifying by predetermined gains γT, βT the first and second push-pull signals Ts and TEp from the push-pull signal detecting unit 210 and an adder 313 for adding the amplified output signals and the phase difference detecting signal TEd from the phase difference detecting unit 220 to thereby output the detracking signal ΔT to the tracking control unit 204.

Simultaneously, a radial shift signal operation unit 320 is comprised of an amplifier 321 for amplifying by a predetermined gain γR the first push-pull signal Ts from the push-pull signal detecting unit 210 and an adder 322 for adding the amplified output signal and the second push-pull signal TEp to thereby output the radial shift signal ΔR to the sled control unit 206.

Figure 9:
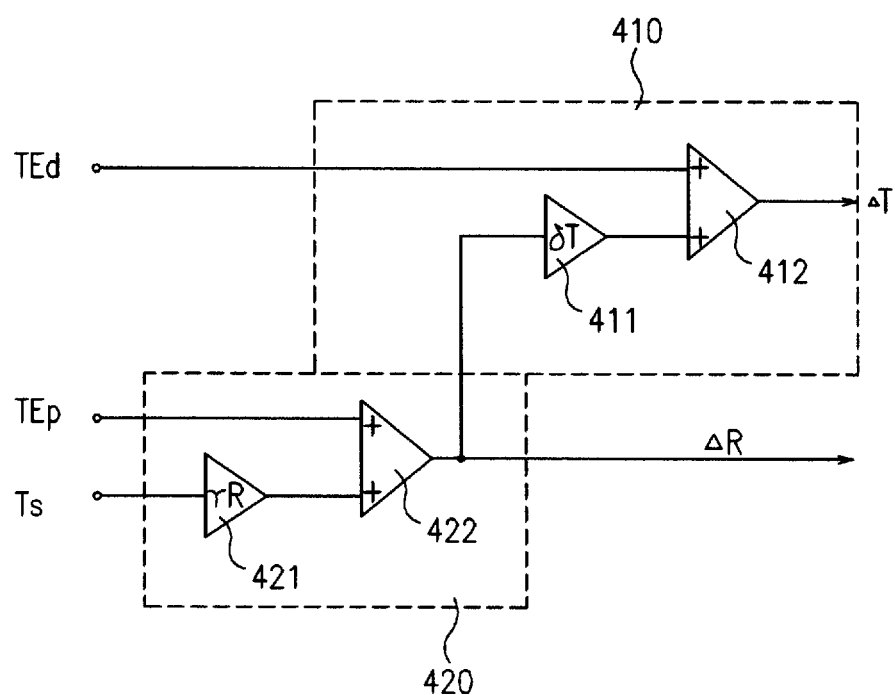
FIG. 9 is a circuit diagram illustrating still another embodiment of a tracking signal operation unit and a radial shift signal operation unit of FIG. 7.

FIG. 9 is a circuit diagram illustrating still another embodiment of a tracking signal operation unit and a radial shift signal operation unit of FIG. 7. Referring to FIG. 9, a radial shift signal operation unit 420 is comprised of an amplifier 421 for amplifying by a predetermined gain γR the first push-pull signal Ts from the push-pull signal detecting unit 210 and an adder 422 for adding the amplified output signal and the second push-pull signal TEp to thereby output the radial shift signal ΔR to the sled control unit 206.

A tracking signal operation unit 410 is comprised of an amplifier 411 for amplifying by a predetermined gain δT the radial shift signal ΔR from the radial shift signal operation unit 420 and an adder 412 for adding the amplified output signal and the phase difference detecting signal TEd from the phase difference detecting unit 220 to thereby output the detracking signal ΔT to the tracking control unit 205.

Accordingly, in the reproducing apparatus using only the digital versatile disk, the detracking signal ΔT and the radial shift signal ΔR are converted by the above operation, thereby performing the tracking control and the sled control.

As clearly discussed in the above, a servo control device of an optical disk recording and reproducing apparatus which adopts both a push-pull method and a phase difference detecting method and converts detection signals using the two methods into a detracking signal and a radial shift signal, thereby concurrently performing tracking control and sled control. In addition, since the tracking control and the sled control can be separately executed, an accurate servo control can be achieved and stability of the apparatus can be ensured.

It will be apparent to those skilled in the art that various modifications and variations can be made in a servo control device of an optical disk recording and reproducing apparatus of the present invention without departing from the spirit or scope of the invention. Thus, it is intended that the present invention cover the modifications and variations of this invention provided they come within the scope of the appended claims and their equivalents.

What is claimed is:

1. A servo control device of an optical disk recording and reproducing apparatus, comprising:

an optical disk;

an optical pick-up unit for recording information on said optical disk or for condensing light reflected from said optical disk into a plurality of divided optical detectors to thereby convert a condensed light into electrical signals;

a reproduction signal output unit for adding said electrical signals outputted from the divided optical detectors within said optical pick-up unit to output an added value as a high frequency reproduction signal;

a focus error detecting unit for adding said electrical signals detected from the divided optical detectors disposed is in a diagonal line position of said optical pick-up unit and for obtaining a difference between said electrical signals to output the difference as a focus error signal;

a push-pull signal detecting unit for adding said electrical signals detected from the divided optical detectors disposed in upper and lower sides position of said optical pick-up unit to detect at a predetermined level added values and thus to obtain a difference, thereby outputting the difference as a first push-pull signal and for adding said electrical signals detected from the divided optical detectors disposed in the upper and lower sides position of said optical pick-up unit to detect at a predetermined level added values and thus to obtain a difference, thereby outputting the difference as a second push-pull signal;

a phase difference detecting unit for adding said electrical signals detected from the divided optical detectors disposed in the diagonal line position of said optical pick-up unit and for comparing phases of added values to thereby output a phase difference detecting signal; and a tracking signal operation unit for amplifying by predetermined levels and adding said first and second push-pull signals from said push-pull signal detecting unit and said phase difference detecting signal from said phase difference detecting unit to thereby generate a detracking signal, thereby performing tracking control and sled motor control.

2. The servo control device as claimed in claim 1, wherein said push-pull signal detecting unit is comprised of:

a first adder for adding the electrical signals from said optical pick-up unit;

a first detecting unit for cutting a low frequency component from an output signal of said first adder and for detecting a high frequency signal;

a second adder for adding the electrical signals from said optical pick-up unit;

a second detecting unit for cutting a low frequency component from an output signal of said second adder and for detecting a high frequency signal;

a third adder for inputting output signals from said first and second detecting units to obtain a difference component, thereby outputting the difference component as said first push-pull signal; and a fourth adder for adding the electrical signals from said optical pick-up unit to obtain a difference component, thereby outputting the difference component as said second push-pull signal.

3. The servo control device as claimed in claim 2, wherein said first detecting unit is comprised of:
a first condenser for cutting the low frequency component from the output signal of said first adder; and
a first detector for detecting an amplitude of the high frequency signal where the low frequency component is cut by said first condenser.

4. The servo control device as claimed in claim 2, wherein said second detecting unit is comprised of:
a second condenser for cutting the low frequency component from the output signal of said second adder; and
a second detector for detecting an amplitude of the high frequency signal where the low frequency component is cut by said second condenser.

5. The servo control device as claimed in claim 1, wherein said push-pull signal detecting unit is comprised of:
a first adder for adding the electrical signals from said optical pick-up unit;
a first detecting unit for cutting a low frequency component from an output signal of said first adder and for detecting a high frequency signal;
a second adder for adding the electrical signals from said optical pick-up unit;
a second detecting unit for cutting a low frequency component from an output signal of said second adder and for detecting a high frequency signal;
a third adder for inputting output signals from said first and second detecting units to obtain a difference component, thereby outputting the difference component as said first push-pull signal; and
a fourth adder for adding the output signals from said first and second adders to obtain a difference component, thereby outputting the difference component as said second push-pull signal.

6. The servo control device as claimed in claim 1, wherein said phase difference detecting unit is comprised of:
a first adder for adding the electrical signals from said optical pick-up unit;
a second adder for adding the electrical signals from said optical pick-up unit; and
a phase difference detecting part for cutting a low frequency component from output signals of said first and second adders, respectively and for comparing phases of the output signals, to thereby output a phase difference detecting signal.

7. The servo control device as claimed in claim 6, wherein said phase difference detecting part is comprised of:
a first condenser for cutting the low frequency component from the output signal of said first adder;
a second condenser for cutting the low frequency component from the output signal of said second adder; and
a phase difference detector for comparing the phases of the output signals from said first and second adders where the low frequency component is cut by said first and second condensers, respectively, thereby outputting said phase difference detecting signal.

8. The servo control device as claimed in claim 1, wherein said focus error detecting unit is comprised of:
an adder for adding the electrical signals outputted from said optical pick-up unit to obtain a difference component therebetween, thereby outputting the difference component as said focus error signal.

9. The servo control device as claimed in claim 1, wherein said focus error detecting unit is comprised of:
an adder for adding the output signals of said first and second adders within said phase difference detecting unit to obtain a difference component therebetween, thereby outputting the difference component as said focus error signal.

10. The servo control device as claimed in claim 1, wherein said tracking signal operation unit is comprised of:
a first amplifier for amplifying by a predetermined gain said phase difference detecting signal from said phase difference detecting unit;
a second amplifier for amplifying by a predetermined gain said first push-pull signal from said push-pull signal detecting unit;
a third amplifier for amplifying by a predetermined gain said second push-pull signal from said push-pull signal detecting unit; and
an adder for adding output signals from said first to third amplifiers to thereby output said detracking signal.

11. A servo control device of an optical disk recording and reproducing apparatus, comprising:
an optical disk;
an optical pick-up unit for recording information on said optical disk or for condensing light reflected from said optical disk into a plurality of divided optical detectors to thereby convert a condensed light into electrical signals;
a reproduction signal output unit for adding said electrical signals outputted from the divided optical detectors within said optical pick-up unit to output an added value as a high frequency reproduction signal;
a focus error detecting unit for adding said electrical signals detected from the divided optical detectors disposed in a diagonal line position of said optical pick-up unit and for obtaining a difference between said electrical signals to output the difference as a focus error signal;
a push-pull signal detecting unit for adding said electrical signals detected from the divided optical detectors disposed in upper and lower sides position of said optical pick-up unit to detect at a predetermined level added values and thus to obtain a difference therebetween, thereby outputting the difference as a first push-pull signal and for adding said electrical signals detected from the divided optical detectors disposed in the upper and lower sides position of said optical pick-up unit to detect at predetermined levels added values and thus to obtain a difference therebetween, thereby outputting the difference as a second push-pull signal;
a phase difference detecting unit for adding said electrical signals detected from the divided optical detectors disposed in the diagonal line position of said optical pick-up unit and for comparing phases of added values to thereby output a phase difference detecting signal; and
a tracking signal operation unit for amplifying by predetermined levels and adding said first and second push-pull signals from said push-pull signal detecting unit and said phase difference detecting signal from said phase difference detecting unit to thereby generate a detracking signal, thereby performing tracking control; and
a radial shift signal operation unit for amplifying by predetermined levels and adding said first and second push-pull signals from said push-pull signal detecting unit and said phase difference detecting signal from said phase difference detecting unit to thereby generate a radial shift signal, thereby performing sled control.

12. The servo control device as claimed in claim 11, wherein said push-pull signal detecting unit is comprised of:

a first adder for adding the electrical signals from said optical pick-up unit;

a first detecting unit for cutting a low frequency component from an output signal of said first adder and for detecting a high frequency signal;

a second adder for adding the electrical signals from said optical pick-up unit;

a second detecting unit for cutting a low frequency component from an output signal of said second adder and for detecting a high frequency signal;

a third adder for inputting output signals from said first and second detecting units to obtain a difference component, thereby outputting the difference component as said first push-pull signal; and a fourth adder for adding the electrical signals from said optical pick-up unit to obtain a difference component, thereby outputting the difference component as said second push-pull signal.

13. The servo control device as claimed in claim 12, wherein said first detecting unit is comprised of:

a first condenser for cutting the low frequency component from the output signal of said first adder; and a first detector for detecting an amplitude of the high frequency signal where the low frequency component is cut by said first condenser.

14. The servo control device as claimed in claim 12, wherein said second detecting unit is comprised of:

a second condenser for cutting the low frequency component from the output signal of said second adder; and a second detector for detecting an amplitude of the high frequency signal where the low frequency component is cut by said second condenser.

15. The servo control device as claimed in claim 11, wherein said push-pull signal detecting unit is comprised of:

a first adder for adding the electrical signals from said optical pick-up unit;

a first detecting unit for cutting a low frequency component from an output signal of said first adder and for detecting a high frequency signal;

a second adder for adding the electrical signals from said optical pick-up unit;

a second detecting unit for cutting a low frequency component from an output signal of said second adder and for detecting a high frequency signal;

a third adder for inputting output signals from said first and second detecting units to obtain a difference component, thereby outputting the difference component as said first push-pull signal; and a fourth adder for adding the output signals from said first and second adders to obtain a difference component therebetween, thereby outputting the difference component as said second push-pull signal.

16. The servo control device as claimed in claim 11, wherein said phase difference detecting unit is comprised of:

a first adder for adding the electrical signals from said optical pick-up unit;

a second adder for adding the electrical signals from said optical pick-up unit; and a phase difference detecting part for cutting a low frequency component from output signals of said first and second adders, respectively and for comparing phases of the output signals to thereby output a phase difference detecting signal.

17. The servo control device as claimed in claim 16, wherein said phase difference detecting part is comprised of:

a first condenser for cutting-the low frequency component from the output signal of said first adder;

a second condenser for cutting the low frequency component from the output signal of said second adder; and a phase difference detector for comparing the phases of the output signals from said first and second adders where the low frequency component is cut by said first and second condensers, respectively, thereby outputting said phase difference detecting signal.

18. The servo control device as claimed in claim 11, wherein said focus error detecting unit is comprised of:

an adder for adding the electrical signals outputted from said optical pick-up unit to obtain a difference component therebetween, thereby outputting the difference component as said focus error signal.

19. The servo control device as claimed in claim 11, wherein said focus error detecting unit is comprised of:

an adder for adding the output signals of said first and second adders within said phase difference detecting unit to obtain a difference component therebetween, thereby outputting the difference component as said focus error signal.

20. The servo control device as claimed in claim 11, wherein said tracking signal operation unit is comprised of:

a first amplifier for amplifying by a predetermined gain said phase difference detecting signal from said phase difference detecting unit;

a second amplifier for amplifying by a predetermined gain said first push-pull signal from said push-pull signal detecting unit;

a third amplifier for amplifying by a predetermined gain said second push-pull signal from said push-pull signal detecting unit; and an adder for adding output signals from said first to third amplifiers to thereby output said detracking signal to a tracking control unit.

21. The servo control device as claimed in claim 11, is wherein said radial shift signal operation unit is comprised of:

a first amplifier for amplifying by a predetermined gain said phase difference detecting signal from said phase difference detecting unit;

a second amplifier for amplifying by a predetermined gain said first push-pull signal from said push-pull signal detecting unit;

a third amplifier for amplifying by a predetermined gain said second push-pull signal from said push-pull signal detecting unit; and an adder for adding output signals from said first to third amplifiers to thereby output said radial shift signal to a sled control unit.

22. The servo control device as claimed in claim 11, wherein said tracking signal operation unit is comprised of:

a first amplifier for amplifying by a predetermined gain said first push-pull signal from said push-pull signal detecting unit;

a second amplifier for amplifying by a predetermined gain said second push-pull signal from said push-pull signal detecting unit; and an adder for adding output signals from said first and second amplifiers and said phase difference detecting signal from said phase difference detecting unit to thereby output said detracking signal.

23. The servo control device as claimed in claim 11, wherein said radial shift signal operation unit is comprised of:

an amplifier for amplifying by a predetermined gain said first push-pull signal from said push-pull signal detecting unit; and an adder for adding an output signal from said amplifier and said second push-pull signal from said push-pull signal detecting unit to thereby output said radial shift signal.

24. The servo control device as claimed in claim 11, wherein said tracking signal operation unit is comprised of:

an amplifier for amplifying by a predetermined gain said radial shift signal from said radial shift signal operation unit; and an adder for adding an output signal from said amplifier and said phase difference detecting signal from said phase difference detecting unit to thereby output said detracking signal.

\* \* \* \* \*